United States Patent [19]

Ahl

[11] Patent Number: 5,559,795
[45] Date of Patent: Sep. 24, 1996

[54] METHOD IN A TDMA RADIOSYSTEM TO LET A CENTRAL STATION COMMUNICATE WITH BOTH PERIPHERAL STATIONS AND OTHER CENTRAL STATIONS

[75] Inventor: Peter Ahl, Malmo, Sweden

[73] Assignee: Inventahl AB, Malmo, Sweden

[21] Appl. No.: 284,409

[22] PCT Filed: Feb. 3, 1993

[86] PCT No.: PCT/SE93/00091

§ 371 Date: Sep. 16, 1994

§ 102(e) Date: Sep. 16, 1994

[87] PCT Pub. No.: WO93/15565

PCT Pub. Date: Aug. 5, 1993

[30] Foreign Application Priority Data

Feb. 3, 1992 [SE] Sweden ................................ 9200283

[51] Int. Cl.⁶ ................................................ H04B 7/24
[52] U.S. Cl. ......................... 370/60; 370/94.1; 370/95.1; 370/95.3; 455/53.1
[58] Field of Search ...................... 370/95.1, 95.3, 370/29, 30, 60, 60.1, 94.1, 94.2, 97; 455/33.1, 53.1, 54.1, 56.1; 379/58, 59, 63, 56

[56] References Cited

U.S. PATENT DOCUMENTS

| 3,745,462 | 7/1973 | Trimble . |
|---|---|---|
| 4,107,609 | 8/1978 | Gruenberg . |
| 4,144,496 | 3/1979 | Cunningham et al. . |
| 4,169,214 | 9/1979 | Stump . |
| 4,414,661 | 11/1983 | Karlstrom . |
| 4,517,669 | 5/1985 | Freeburg et al. . |
| 4,541,121 | 9/1985 | Blum . |
| 4,625,308 | 11/1986 | Kim et al. . |
| 4,633,463 | 12/1986 | Mack . |
| 4,686,672 | 8/1987 | Namiki . |
| 4,688,218 | 8/1987 | Blineau et al. . |
| 4,696,053 | 9/1987 | Mastriani et al. . |
| 4,698,803 | 10/1987 | Haselton et al. . |
| 4,755,992 | 7/1988 | Albal . |
| 4,759,051 | 7/1988 | Han . |
| 4,775,999 | 10/1988 | Williams . |
| 4,785,450 | 11/1988 | Bolgiano et al. . |
| 4,833,701 | 5/1989 | Comroe et al. . |
| 5,239,671 | 8/1993 | Linquist et al. . |
| 5,263,177 | 11/1993 | Schieve et al. . |
| 5,285,443 | 2/1994 | Patsiokas et al. ...................... 370/95.3 |
| 5,313,461 | 5/1974 | Ahl et al. . |
| 5,448,570 | 9/1995 | Toda et al. ............................. 370/95.3 |

FOREIGN PATENT DOCUMENTS

| 0201254 | 11/1986 | European Pat. Off. . |
|---|---|---|
| 0418103 | 3/1991 | European Pat. Off. . |
| 2165127 | 4/1986 | United Kingdom . |
| 2203018 | 10/1988 | United Kingdom . |
| WO89/08355 | 9/1989 | WIPO . |
| WO90/03071 | 3/1990 | WIPO . |
| WO90/05432 | 5/1990 | WIPO . |
| WO91/06162 | 5/1991 | WIPO . |

OTHER PUBLICATIONS

Cox et al., "Dynamic Channel Assignment in High-Capacity Mobile Communications Systems," *The Bell System Technical Journal*, 50, 1833–1855 (1971).

*Primary Examiner*—Wellington Chin
*Attorney, Agent, or Firm*—Merchant, Gould, Smith, Edell, Welter & Schmidt

[57] ABSTRACT

Method in a digital wide area system operating in time division and comprising two or several subsystems, each of which comprises at least one central station (CS) and one or several peripheral stations (PS) and covering an area/volume (space) where the area covered basically depends on the radio optical coverage of each central station and underlaying peripheral stations, the communication within and between subsystems that are geographically spread out is created at each central station. A central station is controlled to change mode of operation to operate either as a central station for transmitting and receiving information to and from underlaying peripheral stations, or receiving and transmitting information as a peripheral station (PS) from and to another central station.

29 Claims, 8 Drawing Sheets

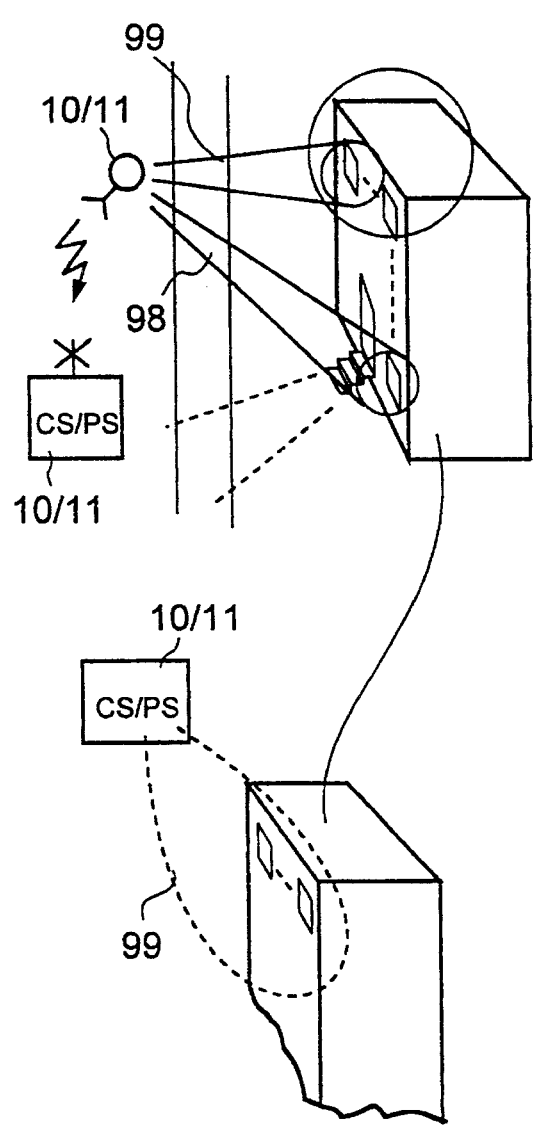
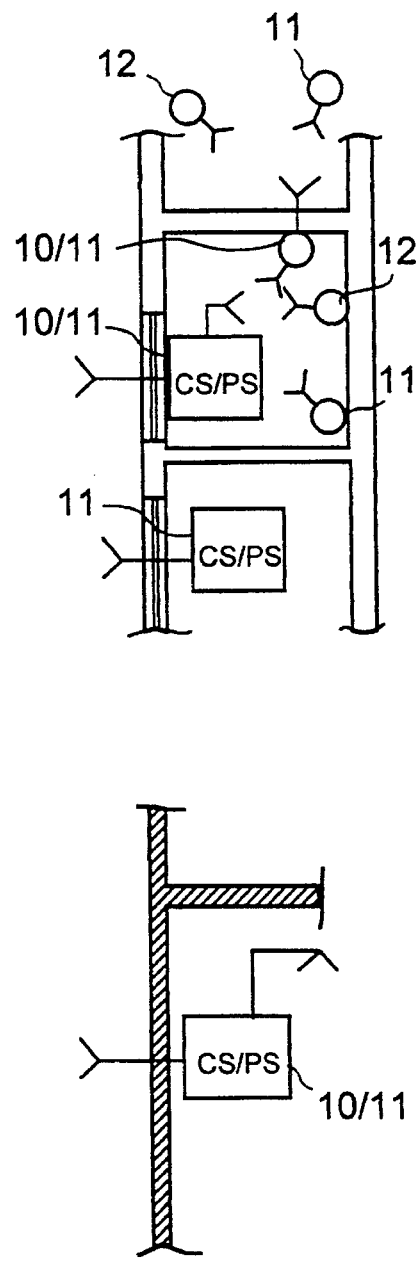
FIG. 7a
FIG. 7b

METHOD IN A TDMA RADIOSYSTEM TO LET A CENTRAL STATION COMMUNICATE WITH BOTH PERIPHERAL STATIONS AND OTHER CENTRAL STATIONS

BACKGROUND OF THE INVENTION

The invention relates to a method and a system for a dynamically alternating radio station.

In systems utilizing a TDMA frame structure, that is time division with or without resource sharing i the space each system is divided into subsystems. Resource sharing in time and space of a common frequency band for spread out subscribers in a radio network provides a possibility for several stations to cooperate and to function simultaneously at a specific frequency band. Each radio network comprises several central stations (CS) and peripheral stations (PS) connected to and working under said central stations. Each central station and associated peripheral stations constitute a subsystem. The systems function in different embodiments in time duplex or frequency duplex with some kind of time frame structure, for instance TDMA. In different system implementations the structure is determined with regard to transmission delay and to the application information in each time frame. The capacity demand decides the number of time slots in each time frame, etc. Such systems are disclosed in PCT/89/SE/00470, PCT/SE90/00681 and PCT/SE91/526.

Said documents do not disclose any systems providing repeating radio functions, radio network branching structures, CS-CS-communication, frame synchronization, functions that will all allow the utilization of a specific frequency band by only one radio transmitter and one radio receiver. Furthermore, no method is disclosed for arranging communication and transfer information between different CS that do not terminate at common station location.

Other existing wide area radio systems functioning according to TDM/TDMA in frequency duplex in fixed applications are fox: instance SR 500 manufactured by SR Telecom, Kanada and other similar systems functioning according to a time division principle having repeating functions. Systems of this type work in TDM mode from a central station or a repeating station towards peripheral stations in a continous mode. From peripheral stations towards a central station or a repeating station the communication is handled in "bursts", i.e. time divided into time slots between peripheral stations that under each central station and repeating station shares a specific frequency that is unique in each cell or sector. In such systems a repeating station is a repeating station during all time intervals. Repeating, splitting between two radio hops is in these systems accomplished by an exchange of frequency. In such cases a double arrangement of equipment and different frequencies are required.

SUMMARY OF THE INVENTION

An object of the present invention is to provide a method and a system for changing the mode of operation for stations functioning with a TDMA frame structure in radio communication networks having central stations and peripheral stations changing of mode of operation as a central station to a peripheral station within each time frame to create improved radio network properties and functions. The method and system will provide several new possibilities to establish telecommunication networks that are more flexible, economical and safe. Such local wireless telecommunication networks can be provided outside buildings in wide area radio networks in urban or rural environment, or in more local applications within buildings, offices etc. The new functional properties of radio stations in radio networks are provided by combining stations having two basic states. One and the same station can operate as a central station and/or a peripheral station and/or a repeating station. Thereby it is possible to establish CS-CS communication in a smooth way without redundant intermediate stations. PS-CS to CS-PS communication will provide a repeating function having a possible constant delays, etc. Said properties are created dynamically during different time intervals by utilizing basically the same units such as antenna, radio, modem, control units each of which is controlled in different states. The results of exchange of mode of operation are improved transmission quality and less interference flexible and consecutive linked (repeating) radio networks in chaine and/or tree-structure, and a possible constant transmission delay independent of the number of repeating functions, a repeating radio link configuration that can form loops with traffical information flows in alternative directions, a cooperating smooth synchronization between different central stations at different locations and a safe exchange of information between different central stations, peripheral stations having controlled antennas, and low cost flexible telecommunication systems in which one type of basic station working in one frequency band is functionally changed.

By using repeating stations in a chain it is possible also to accomplish a constant time delay when transferring user data over more than one radio hop, a plurality of subsystems in series, and by using one and the same frequency band. The method and system according to the present application can be implemented for indoors, outdoors radio stations, or a combination of such systems, or for satellite based or fixed radio stations or mobile stations. At least TDMA frame structure is used having two or more time slots in each frame for communication between two or more stations operating at the same frequency band in different states in alternative time slots within each frame. Due to possible risk of interference and similar problems said stations comprise directed antenna systems having directional antennas that can be coupled in alternative directions between other stations that each station is communicating with when the present station is in CS state or PS state.

Each PS can be associated to several central stations besides the central station frequently communicating with said peripheral station so as to achieve redundancy etc. Several central stations can cooperate at the same time covering the same area or adjacent areas at a specific frequency band and a possible coordination in time and direction by combined direction with different stations. As a result it is possible to achieve an increased capacity and an increased redundancy. The communication between each CS-PS is accomplished by utilizing one or several time slots in each consecutive time frame. It is possible also to use polling of peripheral stations if the communication demands are low.

The method according to the invention in a TDMA radio network having central stations and peripheral stations communicating to each other includes the steps of controlling a CS or a PS to operate alternatively as a CS and alternatively as a PS during each time slot. A certain software program function controls the station in CS mode and an alternative software program function controls the station in PS mode. The exchange is made dynamically in any chosen time frame, and it is possible to operate at the same frequency band in both states.

Thus, according to the method it is possible to use the same basic hardware units such as the antenna, the radio transmitter, and the same radio receiver. Furthermore, units for modulation, demodulation and control are used in both modes of operation.

By implementing the method in a radio system operating with TDMA structures and especially in systems that can be controlled in direction of transmission in the ether in each time slot it is possible to solve problems concerning frame synchronization between central stations situated at different geographical sides without requiring other stations or communication systems. The same relative starting and ending time in the frames of subsystems are provided to central stations that can interfere independent of the possition between geographically spread out central stations. If different subsystems cannot establish contact they do not necessarily have to be synchronized to decrease the risk of interference. By synchronizing different central stations it is possible to decrease or avoid interference between one central station and other central stations or peripheral stations that may interfere within a common frequency band and also to coordinate the frame structure. Furthermore, by this method it is possible to accomplish a flexible internal communication, network configuring possibilities having a fixed and short delay over different subsystems as for instance repeating subsystems, and similar advantages. To accomplish geographical crisp distribution through repeating functions and synchronizing between geographically separated independent central stations it is possible to divide each CS into two sections or functional blocks, one so called high frequency unit (HFU), and a so called low frequency unit (LFU), and to utilize other networks betwen these central stations. Such blocks are primarily radio antenna functions and some control logic, and also some sections, normally in LFU, comprising overruling subsystem logic, interface for subscribers and traffic allocation functions, etc. The advantage by such a division is that LFU functions of several subsystems can be gathered at one location so as to provide a smooth communication between different subsystems.

One embodiment of the method according to the invention will be described below. A new CS in an area is configured to existing stations as a new station that is possible to reach and possibly may cause interference. The stations are assumed to be able to operate within the same frequency band. Existing stations transmit identification and also information concerning the starting time pattern, etc, of the time frame and new stations are requested to reply. If a new CS can be reached only by another PS' that may interfere only synchronization to that frame is required. A new station that will operate as a PS and also as a CS "listens" in different directions during PS mode. The receiver of such a station is switched on to receive information from other CS' or PS'. Normally, with regard to fixed PS', polling can be made by central stations because each central station knows what PS' to ask for, i.e. an identity, and also that only such stations that receive an identity are allowed to reply. Also unknown peripheral stations or central stations/peripheral stations are allowed to reply to a general request from a CS. For normal peripheral stations there can for instance be a desire to authorize peripheral stations that should be allowed to be connected. To synchronize central stations that for instance are owned by different operators and normally should not be or need to be in contact with each other before exploiting new central stations a method could be applied which utilizes logging on of new unknown central stations/peripheral stations for synchronizing and a slow exchange of information in a multiframe structure. In such a case any new central station is then specified as an unknown PS that has to reply to an identity request from a CS. If an existing CS transmits in repeated intervals such requrests, search ID (SID), and a new CS/PS listens in different directions and receives information the CS/PS can optimize the antenna direction thereof towards any desired or preselected CS, random CS, most adjacent CS, most optimal CS, etc. For instance, when a CS/PS has chosen an appropriate direction towards a CS it will transmit a reply, reply ID (RID), in a request and reply pattern that is normal to a new PS under a CS. The CS/PS clock speed is received from the CS, and also information about the frame and during what time interval the identity reply should be transmitted. The delay between the request and the reply will vary with the double progration delay. This will give a distance at the PS to the CS/PS.

To avoid that new logging ons of stations requrire that much capacity in existing systems it is possible, besides existing CS' transmitting logon data automatically, the step is controlled by an operator when a loggon is initiated. Then the CS/PS logging on is put in a polling routine from existing central stations. When a new CS in this way has received the frame clock speed from another CS the new CS can change and operate in the CS mode. The new CS changes over to the PS state in a chosen time interval in a multi frame pattern and will direct the antenna thereof to the CS to which it has been logged on.

When the communication channel has been opened between each station also the reversed condition can be controlled, i.e. the new station will act as a CS and the existing CS temporarily will act as a PS that is requested in a similar manner. Corresponding successive requests may continue in a multi frame pattern, i.e. a repeated number of frames having the same time slot so as to check if a new traffic is to be transmitted, error conditions, etc. If required one or several time slots can be allocated in each time frame for each of the central stations where the central station transfers from one state to the other.

The method can be applied to a PS having an adaptably controlled antenna towards the PS. When a CS/PS has identified the direction towards any suitable CS the actual direction data is stored at the CS/PS. Compensation for peripheral stations that are mobile, relocatable, etc can be accomplished by providing each CS/PS with a function for updating-direction and relational direction to the desired CS. A local reference direction determined with regard to any change of direction of the PS antenna system such that a corresponding compensation can be made by turning the antenna system such that the CS/PS will maintain the direction towards the present CS.

Some of the advantages by the method and system according to the invention are:

frame synchronization with a simultaneous frame time interval at geographically separated central stations, a communication channel eller channels between central stations, repeating signals from one CS through another without delay if there is an offset of at least one time slot upwardly to a CS, CS/PS having a similar frame structure in the same frequency band Besides the fact that the CS/PS and a subsystem can operate as a repeating station it can also operate as a CS in later subsystems also within the same time frame so as to optain a constant time delay at the same frequency with basically the same physical units without necessarily requiring an extra radio antenna, no extra radio head (receiver/transmitter) is required modem etc., for a subsequent repeating as in existing systems having a constant time delay, for instance such defined within each subsystem.

A PS having a dynamically directed antenna can simulatneously be received, such a station having possibilities to increase redundancy, to communicate with one or several central stations in different directions at the same frequency band to give a more simple installation, etc. The frame synchronization to apparently the same time to different subsystems, and the communication between geographically spread out central stations and probably completely independent central stations or central stations/peripheral stations will provide a possibility of basically independent handling of traffic flow between different subsystems of different subscribers even if they may interfere when operating within the same or partly the same frequency band. For instance central stations or central stations/peripheral stations that are installed can be controlled to transmit automatically without the control of an operator frame synchronization information and also other identity data to central stations in intervals. Thereby new central stations/peripheral stations will be informed of the existing network and can log on as a PS to another CS or CS/PS. A varying flow of communication in either direction may take place when a CS/PS is logged on as a PS to another CS or a CS/PS (a way of obtaining repeating stations), and an exchange of information concerning among other things the network can be provided for coordinating the use of time slots in different directions and for decreasing the interference.

Several subsystems may be coupled in links or be branched into a tree structure, etc. If a CS basically is to be operating as a repeating CS/PS station the total capacity within each time frame can be divided up to for instance half of the capacity (one half of the number of time slots are allocated upwardly) to the next repeating station. For instance even or odd time slots are displaced for instance one step upwardly or to the closest higher time slot, before they are transmitted further under the repeating station (downwardly) in the same time frame. In this way the traffic capacity in the embodiment has been divided with one half in each direction within repeating subsystems and the original subsystem having a sustained delay. The amount of information that is transferred upwardly and downwardly in the system at a repeating station is controlled by specific requirements in each subsystem and between each subsystem. The amount of information within or between subsystems included in for instance a linked chain may vary for any subsystems in a link within each link and so will the amount of information between links (subsystems). The total amount of information can reach or leave a defined start of a link network is maximized by each subsystem capacity and the interference situation at each location. The solution will mean also that radio loopes can be established when the linking is initiated, for instance in different directions so as to include after a number of linking subsystems, the "loope" for repeatings stations. Thereby alternative routes of traffic can be created that will increase the security if one loope is damaged, i.e. when a link is broken.

Each PS having a redirectable antenna will be more easy to install if a fixed directed antenna or other antennas are not used, because it can be directed towards different central stations so as to create redundancy. For instance may also two or more central stations having the same frame structure constitute, also on different distances, alternative redundant connection path for each PS when such arrangements are required. This is accomplished by giving each PS knowledge about the frame time of each CS and by compensating such a PS with regard to different propagation delay when communicating with each of the central stations.

To avoid interference between subsystems, and in some cases between stations within a subsystem, for instance in time duplex, operating within the same frequency band each station location is taken into consideration before chosing an appropriate or several appropriate time intervals to decrease unnecessary interference. Based on the fact that stations that are placed geographically around and along a straight line probably will interfere with a higher probability if the same time interval is chosen within the same frequency band, for instance the same polarization etc, this is avoided in advance by applying a priority selection of the time interval when allocating time slots.

The time frame consists of several time slots which can be selected. To simplify selection of suitable time slots whithout unnecessary coordination between stations when demand assignment; is used it is possible to organize the total number of time slots in certain sub-groups within each frame according to CSSF, PSSF (FIG. 6a). Further for stations which occur to become risk pairs as described in PCT/SE89/00470 separate selection of time slots groups should be used to avoid unnecessary interference arranged in a way that "time groups" for stations that might interfere if they use time slots near each other are avoided by using different selection of time slot groups for such stations.

By inserting and dropping digital flows at a CS and a PS and also a CS/PS information can be transferred in a flexible way. Interfaces for different signals that are synchronous, asynchronous, multiplexed or unmultiplexed from different networks can be detected to form traffic connections, i.e. allocation of time slots in each subsystem in a present direction. As an alternative connections and disconnections can be handled by an operator.

BRIEF DESCRIPTION OF THE DRAWINGS

The invention will now be described in more detail by means of different embodiments, reference being made to the accompanying drawings, in which FIG. 1a) schematically illustrates an example of a subsystem for the transfer of digital information flows with a CS having a directed antenna and one or several peripheral stations having fixed directed antennas or dynamically redirectable antennas, FIG. 1b) illustrates how several subsystems can be formed step by step in a modular way, FIG. 1c) illustrates an example of how flows of traffic can cooperate between subsystems so as to accomplish redundancy, FIG. 7a and 7b show an application example utilizing outdoors and indoors communication in a combination.

DETAILED DESCRIPTION

Figure 1A:
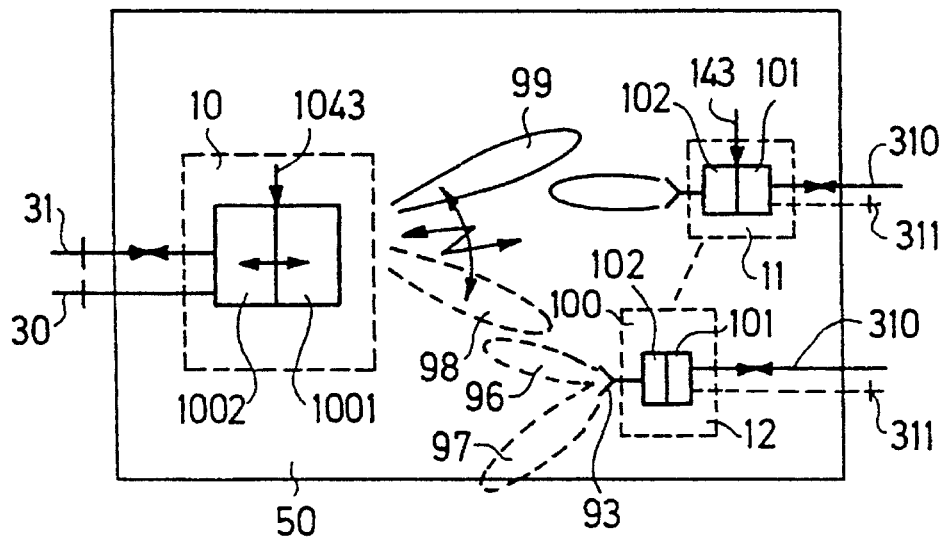

With reference to FIG. 1 details are described for establishing a subsystem. A CS is shown divided into two parts 1002 and 1001 in a low frequency unit LFU, and a high frequency unit HFU that can be separated by a communication interface 1043. The communication interface can be formed for different standards so as to make possible the use of other communication medias such as fibre, SDH-ATM, satellite, and microwave links, etc. User information is represented by a digital signal 31. A control signal through an external connection and disconnection of time slots in the subsystem are shown at 30. The control of antenna system is represented by main antenna loops that may point in different directions 99, 98 for different peripheral stations during different time intervals.

Figure 1B:
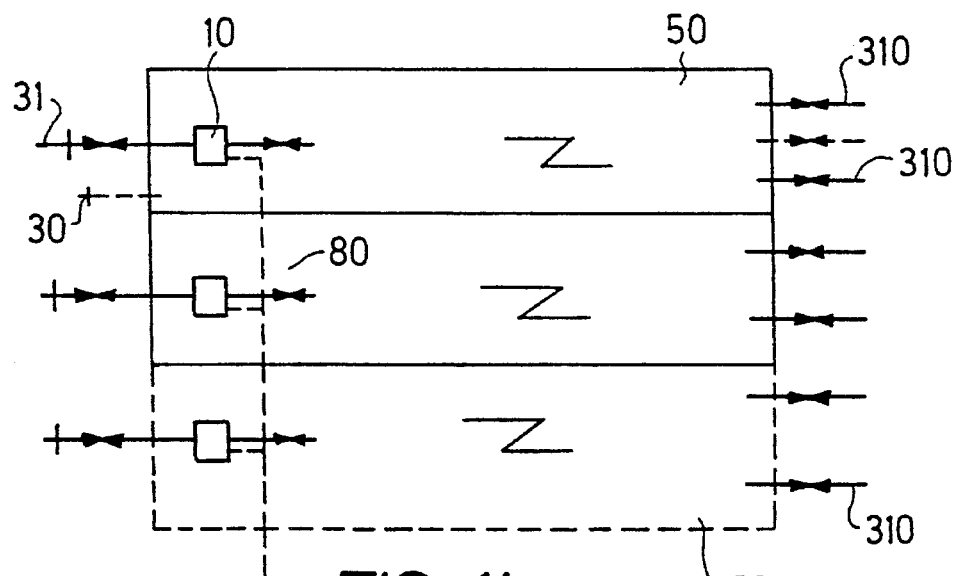

A PS is shown at 11. Similar to a CS a PS can be designed to have a corresponding modularity and a HFU-, LFU-function. However, normally it is not required that peripheral stations do not necessarily have to be separated physically unless this is made for installation purposes. Also each of the peripheral stations can be arranged to carry a directed antenna 93 for transmitting in different directions 97, 96. One or several peripheral stations can be connected under a CS. The traffic of a PS and a CS can be carried out so that one or several time slots are connected depending on the traffic demands in each consequtive frame, see FIG. 6a), according to CSSG, PSSF. The traffic to and from each PS is referenced as 310. External traffical connections and disconnections are shown at 311. FIG. 1b) shows that the system can comprise a plurality of subsystems 50. Several subsystems can cooperate at each site.

Figure 1C:
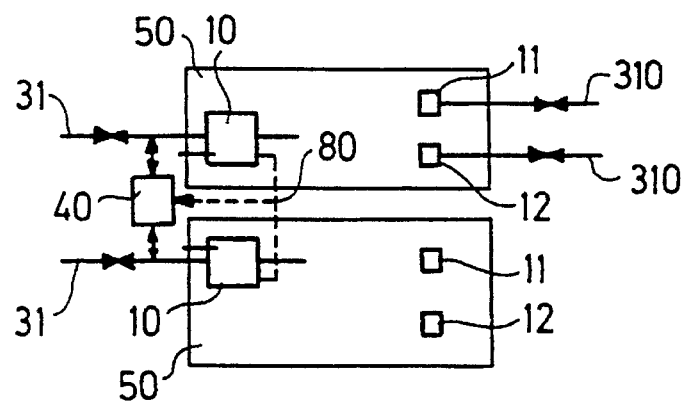

FIG. 1c) shows an example of how subsystems at a CS site traffically can be coupled so as to provide redundancy at the same frequency band. Normally these subsystems may cover the same area and thus it is possible to achieve a double traffic capacity at the same frequency band, if time intervals and directions for transmitting and receiving are coordinated for avoiding interference between subsystems. In-this case a redundancy of 1+1 at the CS is obtained. However, also central stations of several subsystems may cooperate. A similar method can be used at each PS or CS or PS/CS if redundant couplings are desired.

Figure 2:
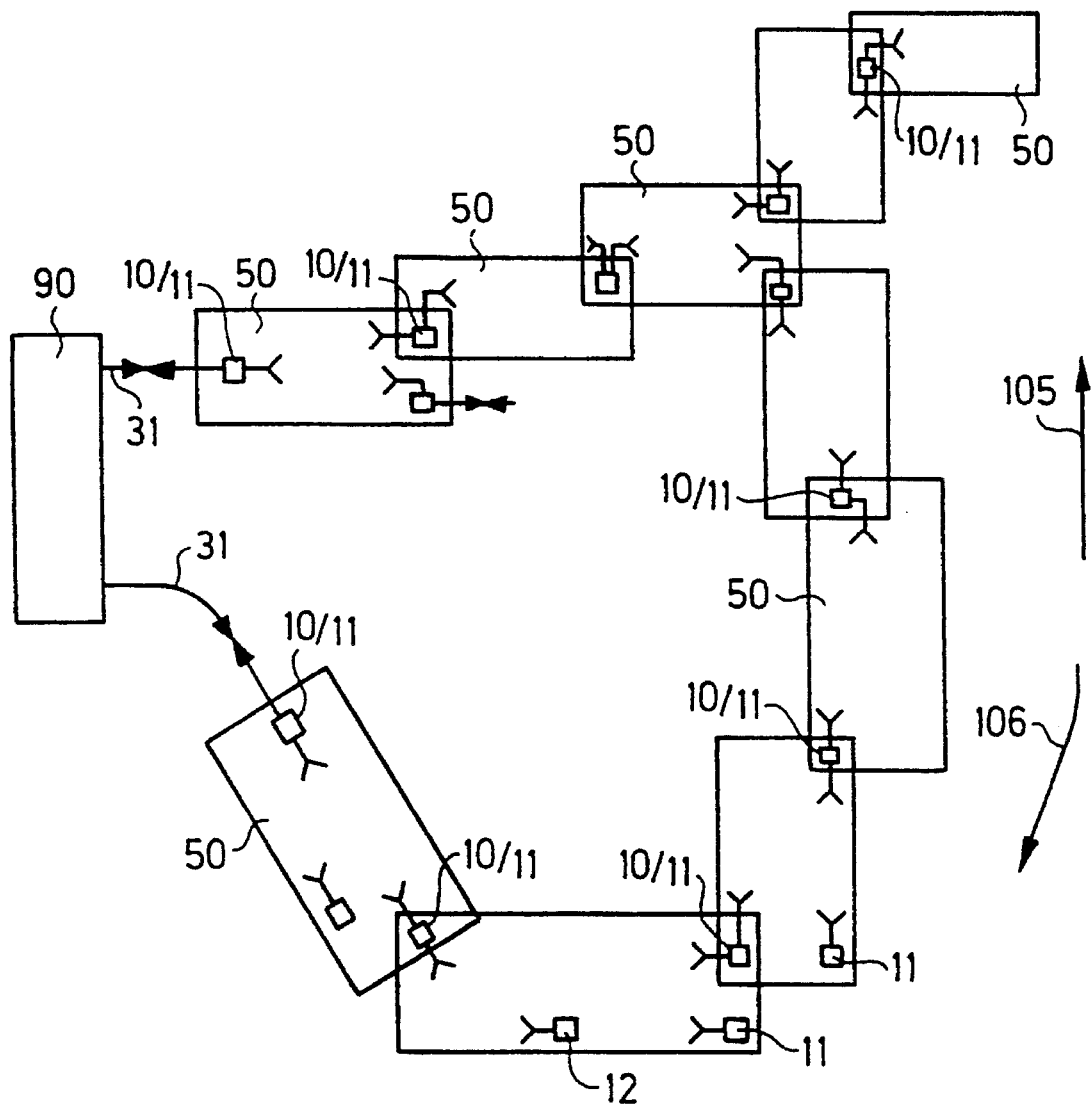
FIG. 2 illustrates a possible result of the invention having subsystems that are linked in a chain form or splitted in different directions.

FIG. 2 shows an example of a network configuration of subsystems that are coupled in cascade after each other. The method including switching between CS and PS mode will make this type of configuration possible in a very attractive way considering flexibility and economy and a constant time delay corresponding to the delay of one subsystem. Other advantages apparent from the example is that traffic can circulate in either direction 105, 106 at any time to provide an increased security if one link (in the repeating function) would malfunction.

Figure 3:
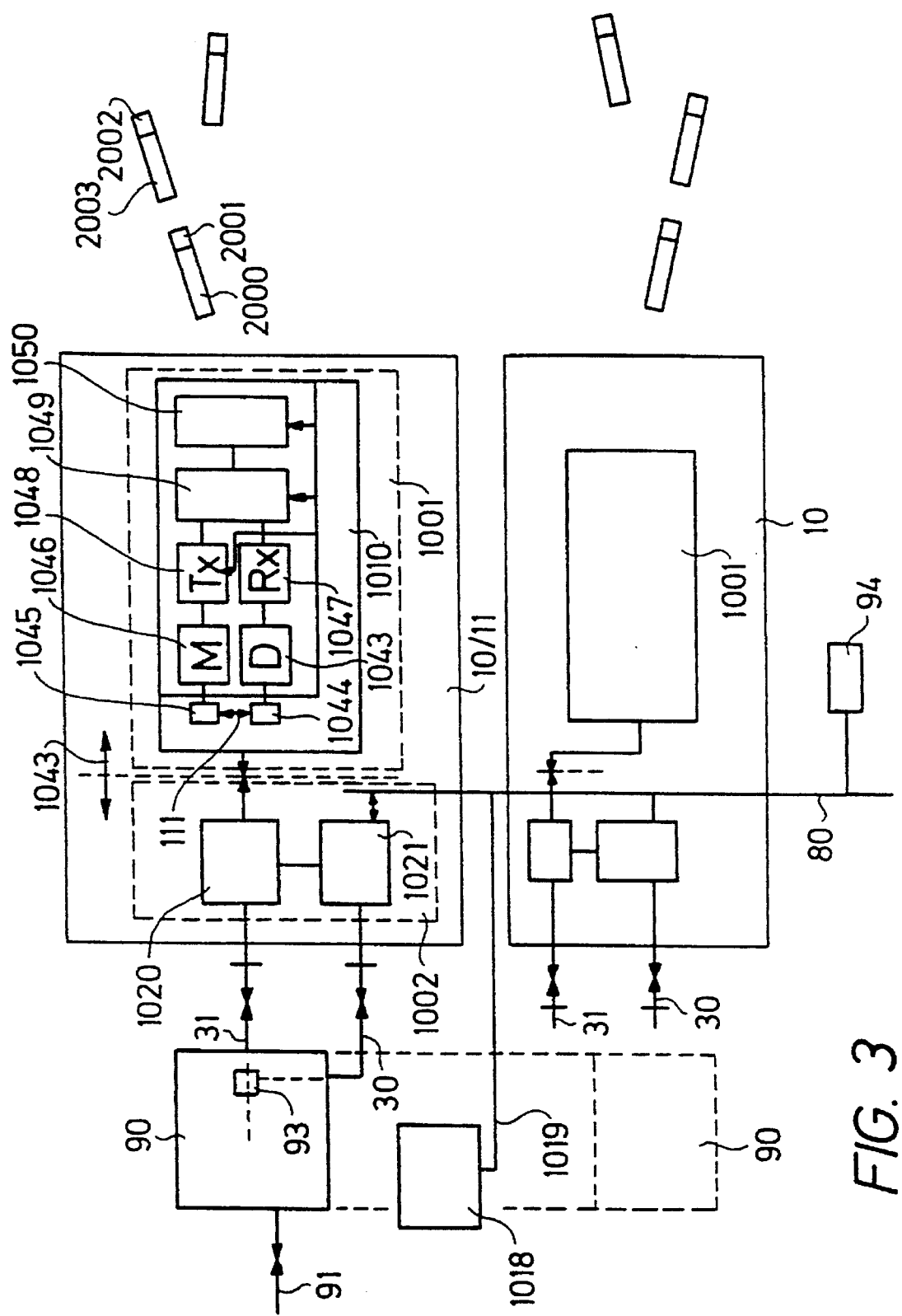
FIG. 3 illustrates a possible implementation of a CS functioning both as a CS and a PS, FIGS. 4a and b illustrate in correspondence with FIG. 3 a system including functions that are integrated, and how the signalling between an external network existing in received digital information flows is utilized for connection and disconnection of channels, network management, etc.

FIG. 3 shows how a digital flow 31 to and from a station is combined with control information from a control function 1021 through a multiplexing function 1020 towards from a HFU function 1001. Said control function includes storing of time positions, the allocation of time slots in the subsystems, etc. In the figure the blocks are separated functionally. Physically these blocks can be integrated to one or several units depending on each application. The station comprises also an application interface 90. In said interface 90 the information to be transferred by the radio system 31 is chosen. Information concerning capacity demands, destinations, etc, is read in the signal information shown at 93. As an alternative digital flows from each subsystem to and from different destinations can be controlled by a control unit 30 or by an operator. When several subsystems cooperate the control may take place through an external function control 1018 for several subsystems. Furthermore, a common network configuration and synchronization can be provided for in a function 94. This is valid especially for a CTP, that is when several high frequency units (HFU) are distributed to different locations. When a CS is separated into two functional units, a LFU and a HFU, it is possible also to coordinate smoothly the communication within and between time flows, and also the communication between a plurality of subsystems at the LFU because the control functions of each subsystem may physically communicate with each other. According to this method it is possible also to form effective communication networks where high frequency units are disposed on different locations along wide band connections on fibre link, for instance according to SDH, ATM, SONET, MAN DQDB, which smoothly may be dropped and inserted. Each HFU may be connected over a varying distance to a common terminating site where several low frequency units are terminated to one central terminal point, CTP. Different suitable standard speeds may exist where a HFU and a LFU are connected, so as to utilize standardized digital multiplexing structures and speed. When using several HFU' at one site several HFU' can be multiplexed to one or several channels of for instance 155 Mbit/s. As an alternative several HFU' can be tapped from a 155 Mbit/s through a simple multiplex unit, for instance of the ADM-type, to the HFU of each subsystem irrespective of the location of each HFU.

When the station operates as a repeating unit the information can be transferred through intermediate memories 1045, 1044 or dropped and inserted at 31. External information is inserted or dropped at 31. The control of traffical connections and disconnections, signalling, network management, etc, is provided at 30 or at 1018 or directly by application 90, for instance through digital flows into the system. Basically the function 90 can be regarded as a conventional circuit coupled exchange possibly including an interface to the external systems corresponding to standardized digital structures for multiplexed/unmultiplexed and synchronous or unsynchronous digital flows. Signal information included in said flows that is communicated to another unit or units such as exchanges can be read and passed on to a control channel 30 for connecting or disconnecting a time slot or several time slots. In such cases common multiplex systems such PABX can be connected to obtain transparent channels through a subsystem. In a system including 2.048 Mbit/s the signal channel T16 is normally used for connecting and disconnecting traffic channels and other signalling. Such signalling includes standardized protocols like CCITT No. 7, V.5 or other protocols. If this channel is allocated for instance to an exchange connected at a PS said signal channel is read by the subsystem for connecting and disconnecting other traffic channels. In this way a concentration of traffic can easily be achieved. The flow of information can be constituted also by an ATM exchange having a cell structure or a so called frame relay type of information packaging on 1.544, 2.048 Mbit/s or corresponding speeds.

In combination with the structure described above it is possible also that geographically distributed CS/PS, etc can be applied under each HFU. This will further increase the possibilities for establishing flexible telecommunication networks. At any chosen location in for instance the countryside the HFU is disposed, said HFU being terminated to a fibre network with a LFU remotely disposed in an urban area. It is then possible to form under such an HFU a varying network structure so as to follow subscribers in rural areas by adding new sub systems under such HFU to further extend the radio coverage.

Figure 4A:
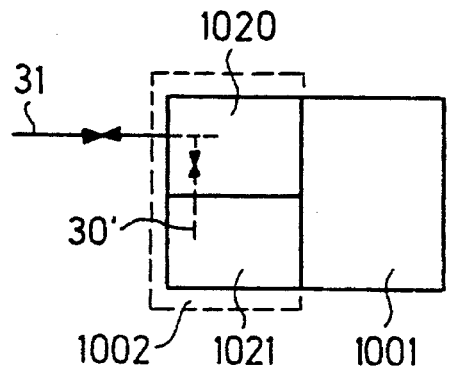

A somewhat different but more compact embodiment is illustrated in FIG. 4a). This shows that the physical embodiment when implementing the system is not important whereas it may vary in dependence of different requirements and demands and also of the utilization of different technical solutions. Signal information 31' for a subsystem can be extracted from a digital flow according to the figures. Furthermore, the figure shows how a subsystem can be formed with a station realized in a compact integrated form instead of being physically separated according to FIG. 3. When the CS or CS/PS of several subsystems terminate at the same site they cooperate on a common communication channel 80. It will then be more easy to accomplish synchronization interference calculations, etc.

Figure 4B:
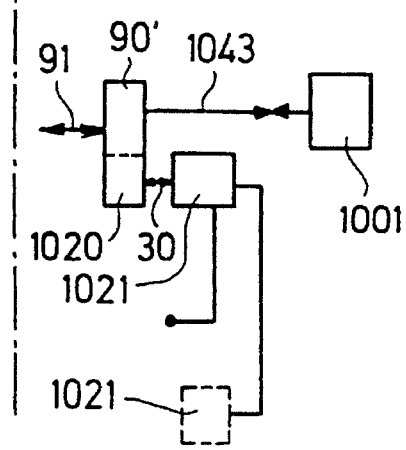

FIG. 4b) shows another embodiment for providing a corresponding function in subsystems. Functions for multiplexing of signals, and control of subsystems having subscriber flows 91 are drawn in a different way but the function is basically the same.

Figure 5:
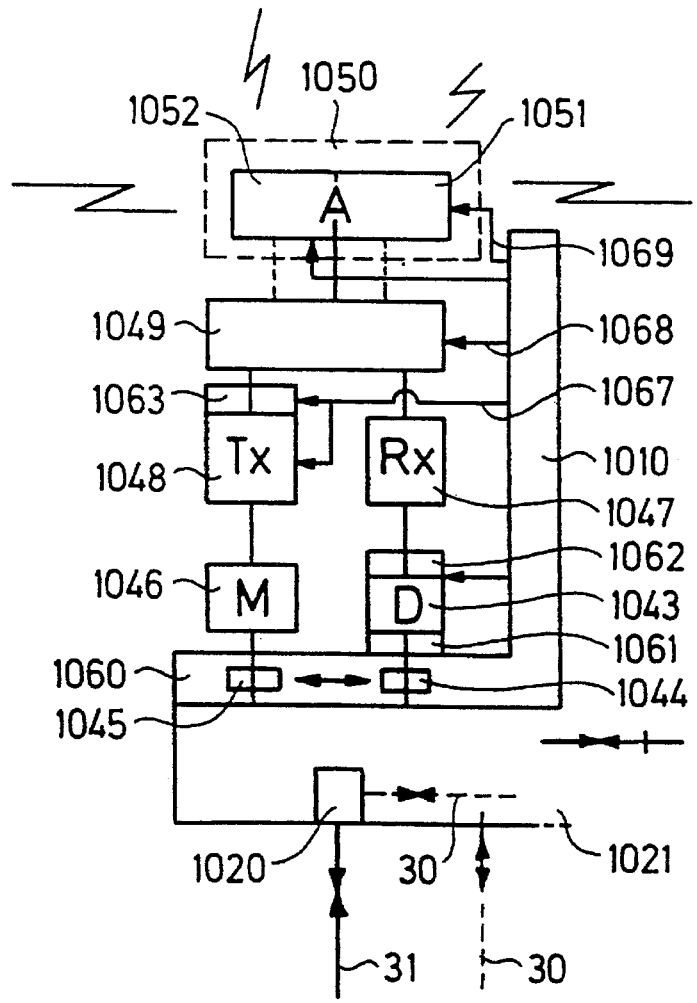
FIG. 5 illustrates one of several possible models of a station, a CS, or a PS or a repeating station, FIG. 6a) shows examples of a frame structure for a CS/PS and a PS from the embodiment of FIG. 6b)

FIG. 5 shows the basic hardware units required in a station that is operable as a PS or a CS or a CS/PS, repeating station. Antenna systems 1051 and 1052 can be constituted by a time and direction controlled directed antenna system. Such antenna systems may have a possibility to control one or several antenna lobes that are controllable in direction and in time. An antenna system which is controllable in regard to individual antenna lobes will be important when functions for splitting of a frequency band is required, as further described below. This can for example be achieved by using multible hornes feeding a common reflector or obtaining alternative directions by activating different hornes. It is possible also to use one, two or several separate discrete antennas that are fixed or electrically directable. At for instance for straight repeating normally only two fixed directed antennas are required, for instance parabols. If a phase array antenna, for instance comprising a plurality of antenna plates that are controlled in common by a phase shift network, it is possible to cover up to 360° in an economical way. Such an antenna type or an antenna of similar type is appropriate in such cases where the repeating station will be operating also as a CS having underlaying PSS. In time duplex the switching between transmitting and receiving mode between radio and antenna is provided at a function or unit 1049. This switching function can for example be exchanged with a duplex filter if frequency duplex is applied. Through a control function 1010 and in interaction with logical functions 1021 the transmitter and receiver normally are switched on and switched off, and the antenna is directed in approprirate directions by demand. It is possible also to control at 1063 the levels of transmitting energy even for all or individual time slots, etc if this is required. When implementing the signal processing, schematically shown at 1062, any possible control, compensation etc per hop is made by the receiving information package for decreasing possible differencies in propagation delays etc. The figure shows transmitter means 1048, receiver means 1047, modulator means 1046, demodulator means 1043, and intermediate memory means 1044, 1045 for incoming and outgoing information.

Figure 6A:
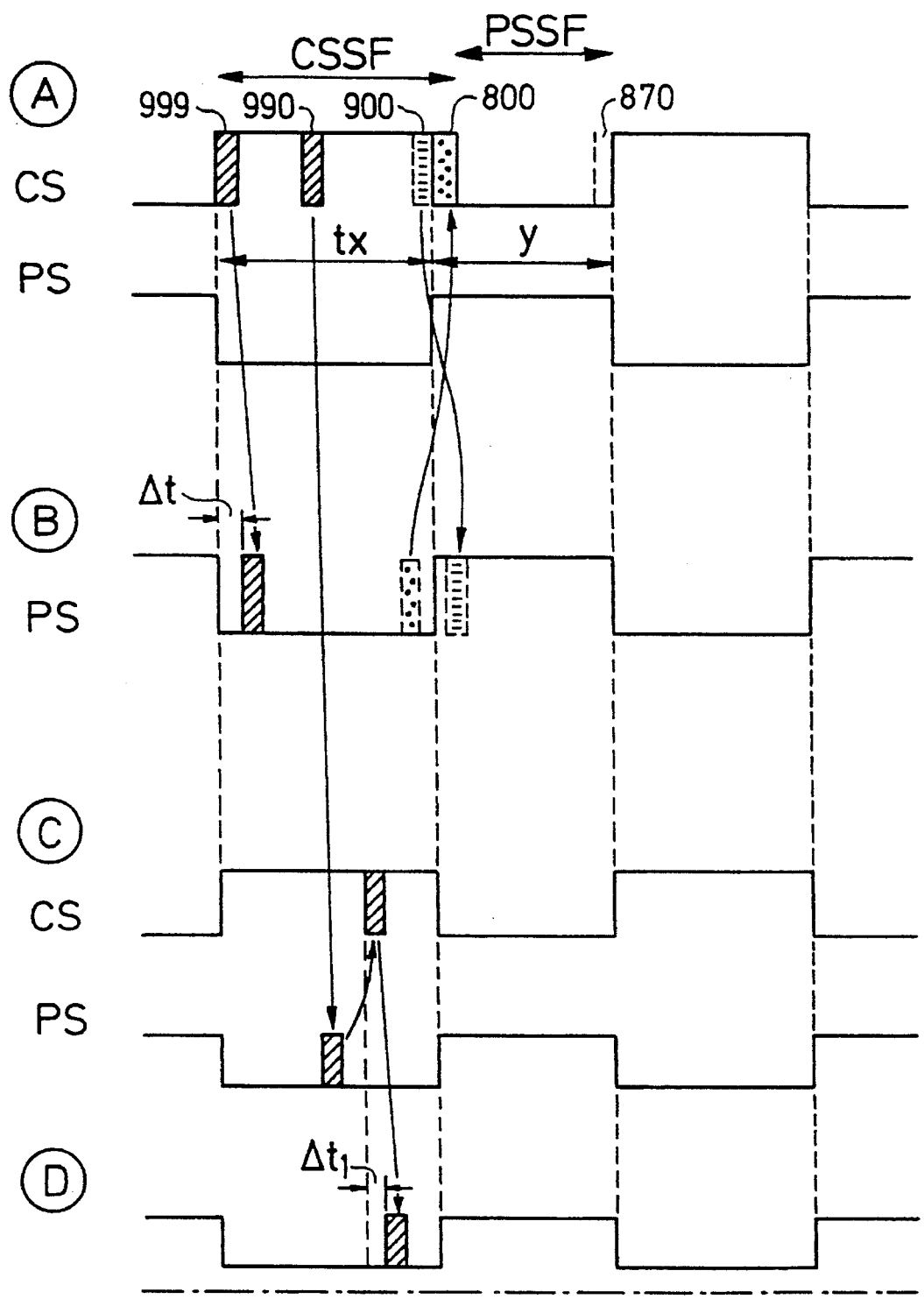

FIG. 6a) shows schematically one of several possible frame structures. One example of a possible station configuration structure as shown illustrates the principle of repeating between subsystems at a constant time delay as shown in 6b). Stations A, C and D represent a CS and/or a CS/PS. Station B represents in the shown embodiment a simple PS, i.e. a station which do not have functions or is allowed to switch the two functional states. To simplify the description the flow is shown only in one direction. Similar steps are taken in the opposite direction. The frame structure for communication into the network from A is shown at x which basically is equal to all stations. x is shown divided into a plurality of time slots 999-900. The transfer of information to B is shown in the example at time slot 999 that is transmitted from A and received at B a certain time interval ($\delta t$) later. A second time slot 990 is chosen for the transmission to C. To enable C to receive said slot it is necessary that C is in PS mode. When said CS has received the information package it can within the time frame x transmit, the information from 990, for instance in a free time slot available in a higher position adjacent to the previous having the antenna system thereof directed towards the station D which a certain time interval later ($\delta t_1$) receives said information. To simplify the allocation for traffic flowing through at a repeating station some time slots can be allocated in advance, for instance every second (odd/even) for receiving another part opposite thereto (even/odd). As a result of each repeating station operating also as a CS and having underlaying PS there is a division of time disposition (traffic capacity at the same frequency) for the through-flow through a repeating station to other repeating stations and also to traffic within each repeating station at the subsystem thereof. A normal scenario is to generally connect channels (time slots) on a consecutive basis in advance in each subsystem through signal packages. Then user data is transferred through the system on a coupled channel or coupled channels which allows such data to flow through the stations within the frame structure CSSF and PSSF. The maximum distance for transfer within a frame structure with constant delay depends on the time length of CSSF and PSSF. If they are 1 ms each the maximum distance to transfer one time slot with constant delay i less or about 300 km. The disconnection takes place in a corresponding way or for instance in a connected channel when no data has to be transferred. The connection in this type of system will take a time corresponding to the connection time in each of the subsystems. If the frame time is comparatively short, for instance some or a few ms a basically neglectable connection time is accomplished for most applications, for instance speach, data. Demands on a fast connection or through-flow of sporadic data flows comprising a varying number of bits at repeating stations or CS/PS corresponding thereto can be met by marking information packages with destination address of the network station according to Frame Realy technique, ATM technique, etc. As an alternative synchronizing or control words can be formed on packages to inform if the package is to be tapped or forwarded. This will continue until the package will find an address where the package is to be tapped.

FIG. 7a and 7b illustrates an application where a system according to the method is implemented for communication to or from offices, industries, etc. According to the method it is possible to admit radio signals only towards one or several houses (walls). At for instance each window where there is a demand for communication a PS or a CS/PS (that is a repeating station) can be connected. This could be done either with a PS behind a window if the signals are emitted so that it is possible to receive the radio energy at a sufficient level, or by arranging a simple antenna for the PS or CS/PS outside the window. In such a case the antenna can be constituted by normal directed or directable antennas. When using the CS/PS function traffic from different units can be collected wirelessly in any space. The CS/PS antenna is disposed, for instance after the penetration into the roof etc, so that spread out terminals of subscribers, etc, in an office or similar location can be provided with small compact peripheral stations, for instance having an integrated antenna system that is directed upwardly. If the CS/PS antenna is mounted in the roof, the PS antenna can be directed upwardly towards said roof so as to avoid disruptions of the radio carrier. The PS can also be provided with a plurality of physically small antennas mounted on the PS where a suitable antenna is chosen in a pattern described above for directed antennas. If communication is to be established from one CS/PS further on to another room, corridor, etc this could be done by for instance a through-connection in a wall according to FIG. 7A.

Figure 8:
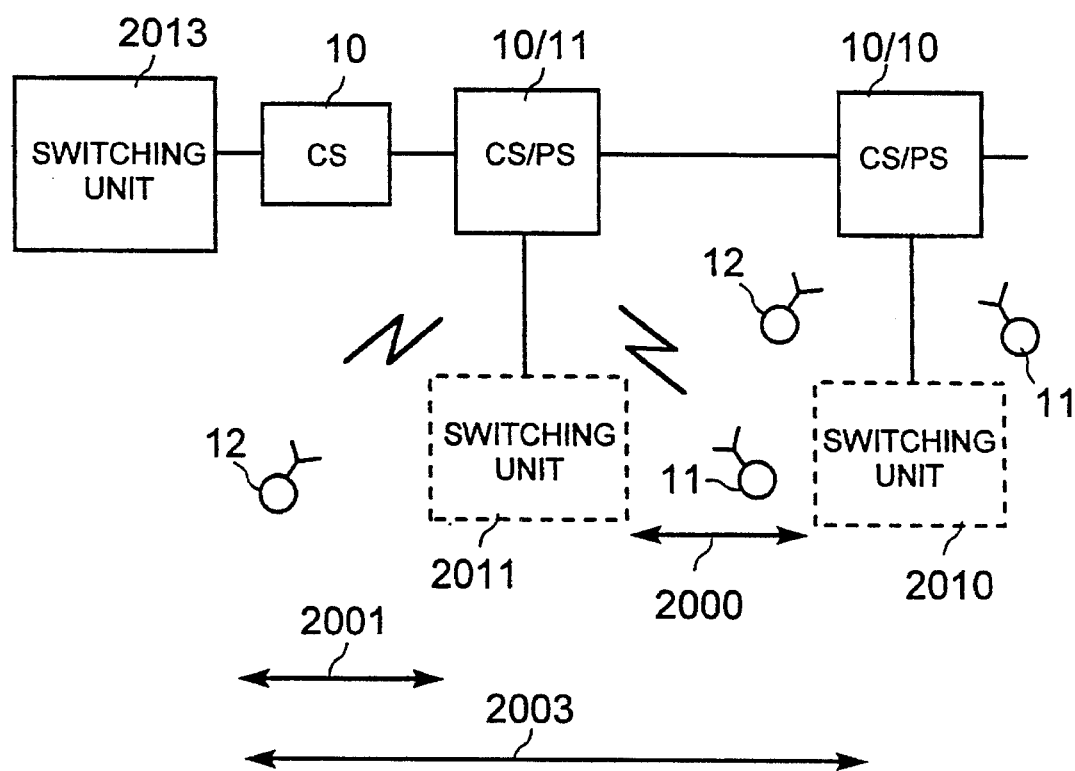
FIG. 8 illustrates an application with traffic within and between subsystems.

FIG. 8 shows an example of the flexibility where an application having traffic between a CS and a CS/PS is dropped and inserted. Traffic can be established within subsystems or between subsystems with switching functions 2013, 2011, 2010. A system of this type can be implemented in different frequency bands. For each type of application the system is adapted accordingly. Whereas 64 kbit/s is a general speed for normal telephone communication, ISDN, it is appropriate to start from such a capacity in each time slot. Another alternative is to start from ATM cells of 48 plus 5 bytes in each time slot. The total capacity or total number of time slots in each frame is adapted to different types of applications. With an increased number of time slots in each frame per radio channel the flexibility is improved, and it is possible to avoid interference between stations in actual systems. Furthermore the time frame should be adapted to an improved time delay for transferring through the system. To make it possible to use standard switching units, multiplexing units etc for avoiding echo attenuation etc the shortest possible time should be chosen. The frame time and the number of information bits in each time slot is chosen in combination with the number of required synchronization bytes, etc. A frame time of 0,5, 1 or approximately 2 ms normally will give reasonable time delays in most applications.

In systems for fixed applications normally a radio channel capacity is chosen that will allow a suitable modulation with appropriate frequency efficiency and roubustness with a comparatively high radio channel speed. An appropriate capacity for generell telecommunication purposes today could be from 40 to 60 Mbit/s radio channel speed or a channel speed corresponding to SONET speed of 51.84 Mbit/s. In other applicatons or other future radio systems other figures could be foreseen. This will give a reasonable number of time slots in each radio channel if 64 kbit time slots are used. It will for instance be possible to obtain 200–400 time slots, if each time slot has a capacity of 64 kbit/s at a delay of 1 or 2 ms in time duplex. The redirection time for the antenna system and for reconnection between CS and PS mode, keying of transmitters to and from CS mode takes place between consequtive time slots. Redirection the losses of this type can easily be kept around or below 1 micro second by using state of the art technique and could be even shorter, for instance by choosing phase shifting networks, switches having fast diodes and similar devices if phase arrays are used. The total traffic capacity in such a system will be approximately 16–20 Mbit/s (in a time duplex system) in each direction if about the same number of time slots are used in both directions. In some applications it is not required to use the same frame lenghts in both directions and it may be useful to dynamically vary the individual frame length, CSSF, PSSF (see FIG. 6a). In cases where frequency duplex is applied for fixed applications each subsystem channel capacity could be approximately twice as large if the corresponding radio channel speed is used in each radio carrier. This would mean that there are potential possibilities to utilize several of the basic hardware units and basically a corresponding logical structure as described above to arrange double capacity etc. in such systems. A special interesting application in order to double the capacity is to double the stations physically at each site and operate the individual station at different frequency bands.

In applications of the type mobile PS or in applications having comparatively dynamical directed PS it is possible to utilize another time slot division and a lower capacity than described above. The communication according to indoors evolving standards such a Hyperlan, DECT, GSM in Europe and similar systems in other regions can be adapted to this type of repeating branched functions etc at a speed around 20 Mbit/s or other speeds according to requirements. Other types of modulation, for instance wide band modulated systems according to CDMA, frequence shifting systems, or by utilizing a plurality of narrow band modulated carriers within each radio channel in SLIP-code or COFDM, for instance for increasing the symbol speed and to decrease the tendency of interference, etc like in QPSK, PSK, QAM and FSK. The above systems can be used with or without an adaptive compensation for multipathing etc. It is possible also to accomplish interaction between an outdoor radio system with an efficient frequency handling and a time and space control combined with other existing and future standards for indoor communication.

Figure 6B:
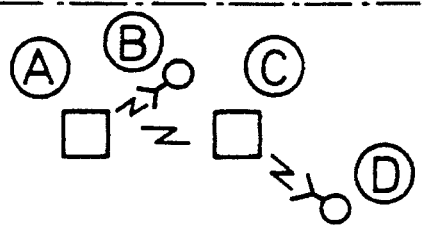

The above description of stations which in a frame structure are controllable in a CS or PS mode in different time slots makes it possible to actual select the frame structure time, i.e. the relation in the time frames between CSSF and PSSF. In the FIG. 6 are these frame structure shown to be about equal. If this relation is controllable it may be possible to use less capacity for actual communication and more for distribution from time to time. For example an existing system may have an expanded time frame CSSF during night time for distribution of information one way. The number of time slots available for PSSF may be decreased correspondingly.

The above description shows how one or several radio band are used i.e. how one or several modulated channels are organized in several sub-channels as in PCT/SE90/00681, each sub-channel occupying different frequency bands corresponding to their capacity, etc. Some of the advantages with such an arrangement are improved selective fading or delay spread as longer digital symbols are achieved for digital transmission. Selective error detection and error correction are possible to implement on sub-channel level which simplify corrections of errors as only part of the total information transfer has to be corrected. Other methods to compensate for reflections like phase compensation, alternate polarization selection, optimized antenna beam steering per hop or alternate hop routes, etc. within band may not be necessary as the symbols are increased compared to conventional modulation.

This is some of the reasons why modulation methods like COFDM (Coded Orthogonal Frequency Division Modulation) are so interesting for new applications like HDTV.

If selections of sub-channels are made via separated modulated carriers in the total available frequency band and combined with a selection of individual time frame structures for each sub band, resource sharing including frequency, time and direction (space) can easily be added to systems described above or described in the PCT applications mentioned above and PCT/SE 89/00470. This improves also the disturbance immunity between stations and increases the potential to improve the frequency efficiency more than if only time and space (direction) control are performed on one frequency band.

In such systems each sub-channel represents a certain transmission capacity. Each sub-channel represents by a time frame structure generally as described in FIG. 6 and 6a) for time duplex or a corresponding frequency duplex time frame arrangement, then representing one sub-channel in each direction. Each sub-channel represents a number of time slots. The station which allocates transmission resources allocate the time slots which corresponds to the selected sub-channel or sub-channels for example according to selection model based on random or an algorithm which is used for selection of suitable times or frequency or transmission direction use according to an expected minimized interference performance.

As the total transmission capacity is normally not used for each station pair under communication it is possible to use selected capacity representing part of the capacity and bandwidth of one or a number of subchannels. The advantage inludes improvements in selective fading (within the band) and a simplified method to have possible selection of another dimension (frequency) to time and space selection. It may for example simply be implemented by splitting a time frame structure into a number of new time frame structures or letting the total number of time slots corresponding to one carrier channel to be divided in a sub amount of time slots where each time slot structure corresponds to a sub bandwidth of a certain total bandwidth. A control of the antenna system lobe in more than one direction and at each time interval as described above is then normally required when the frequency band is splitted. The example below shows one of many potential structures capacities sub-capacities and it is only shown to give an example to the above description. For example if a station of the above structure has a total transmission capacity of 256 time slots and this corresponds to the use of one Modulator a frame structure for time duplex could correspond to 256 time slots for CSSF and PSSF in FIG. 6. If the total available frequency band is divided into 8 sub-channels with similar sub-division of the frame structure in to 8 individual time frames one for each sub-band. If each of the 8 individual time frames are divided into 256/8 time slots then each time slot of such sub-frame has to be transmitted under 8 times the time on the sub-channel if the same capacity shall be used on the time slots of the sub-frames as on the original frame. This means the slection of a group of time slots corresponds to a selection of a certain part of the bandwidth i.e. sub-channels and there is also no need to change the logical structure of the stations and systems described above. An additional feature is that selection of bandwidths for alternate hops exists. Also, if the frequency licence applications in certain regions of certain reasons do not allow the use of the total bandwidth principally the same logical structure can be used as for a station which can utilize the whole capacity of a station.

In the above example each sub-channel represents a capacity corresponding to ⅛ of the total available number of time slots for a station. This means that the logic function easily can select the required selected bandwidth of the station and be allocating traffic to a certain portion of a table to correspond to number of time slots that are carried by one of the 8 separate carrier.

For transferring or repeating information coming into one station may different antennas for the same station be used for handling transmission in different frequency bands under selected time and direction for each time frame. This is also the possible for transmission in frequency duplex fram mode. A received packet may be received on one frequency band from one specific direction and received or transmit at the same time via another antenna on overlapping time from another specific or overlapping specific direction.

Figure 9:
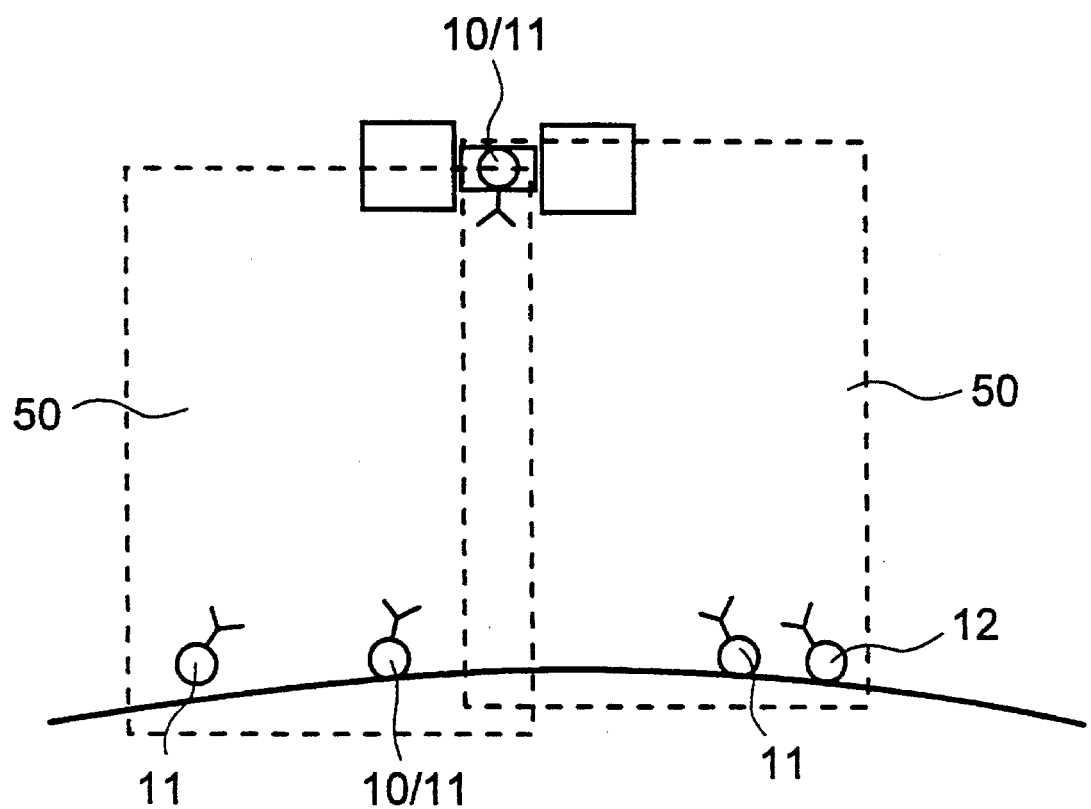
FIG. 9 illustrates an embodiment of the invention where a central station is arranged as a satellite.

Repeating for frequency duplex may thus be arranged in similar way as described for the time duplex arrangement by using separate antenna lobes for transmit and receive mode. In FIG. 9, the invention illustrated in an embodiment where at least one central station is arranged as a satellite. In FIG. 9, like reference numerals indicate like parts described in connection with the previous figures.

I claim:

1. A method in a digital wide area radio system including two or more subsystems, each of which includes at least one central station and one or more geographically spread out peripheral stations, said central station communicating with said peripheral stations in a radio covering area, said method comprising the steps of:

(a) transmitting a first set of information in radio signals from said central station to a receiver of a first peripheral station;

(b) storing said first set of information in an intermediate memory in said first peripheral station, either for transmitting said information to a second peripheral station in a second subsystem or for dropping user information as digital signals when the information is intended for the first peripheral station;

(c) switching a function of said first peripheral station from a peripheral station mode to a central station mode;

(d) transmitting said first set of information in radio signals from a transmitter of said first peripheral station, now operating in the central station mode, to the second peripheral station in the second subsystem;

(e) receiving in said receiver of said first peripheral station, still operating in the central station mode, signals including a second set of information from said second peripheral station and storing said information in the intermediate memory;

(f) switching the function of said first peripheral station from the central station mode to the peripheral station mode; and (g) transmitting said second set of information in radio signals from said transmitter of said first peripheral station, operating in the peripheral station mode, to said central station.

2. A method according to claim 1, further comprising the step of applying a TDMA frame structure having at least a first time slot and at least a second time slot for communicating between said central station and said peripheral stations.

3. A method according to claim 2, further comprising the steps of:
  receiving information in said first peripheral station in said first time slot; and
  transmitting information from said first peripheral station in said second time slot, said first and second time slots being included in one time frame, so as to obtain a constant time delay when repeating between subsystems.

4. A method according to claim 2, further comprising the step of assigning a number of time slots in a time frame based on traffic demands.

5. A method according to claim 1, wherein communication between said central station and said peripheral stations is performed in time duplex.

6. A method according to claim 1, wherein communication between said central station and said peripheral stations is performed in frequency duplex.

7. A method according to claim 1, further comprising the step of modulating said radio signals according to CDMA.

8. A method according to claim 1, further comprising the step of modulating said radio signals according to QPSK.

9. A method according to claim 1, further comprising the step of dividing an available radio band into sub-channels having separately modulated carriers.

10. A method according to claim 1, further comprising the step of transmitting time frame synchronizing signals from said central station to associated peripheral stations.

11. A method according to claim 1, further comprising the step of transmitting radio signals from said peripheral stations to said central station using a directed antenna system.

12. A method according to claim 11, further comprising the step of redirecting said directed antenna system to be directed towards different central stations during different time intervals.

13. A method according to claim 12, further comprising the step of providing in said directed antenna system multiple horns feeding a common reflector.

14. A method according to claim 12, further comprising the step of providing in said directed antenna system a phase array antenna.

15. A method according to claim 11, further comprising the step of arranging in said peripheral stations a plurality of directed antennas.

16. A method according to claim 11, further comprising the step of redirecting said antenna system of said mobile peripheral stations towards its associated central station during relocation of said mobile station.

17. A method according to claim 11, further comprising the step of redirecting said antenna system of said mobile peripheral stations toward its associated central station during relocation of said mobile station.

18. A method according to claim 1, further comprising the step of arranging said first peripheral station in a building to communicate with said central station located on the outside of said building and to communicate with said second peripheral station located inside said building.

19. A method according to claim 1, further comprising the step of providing in said radio system a common network configuration and synchronizing means.

20. A method according to claim 1, further comprising the step of arranging said central stations and said peripheral stations outdoors.

21. A method according to claim 1, further comprising the step of providing said peripheral stations as mobile stations.

22. A method according to claim 1, wherein said switching step comprises the step of changing a mode of operation of said first peripheral station by exchanging control software in said first peripheral station.

23. A method according to claim 1, further comprising the step of arranging at least two central stations to cover a common area and a common set of peripheral stations said at least two central stations being operatively connected by a communication link to provide redundancy.

24. A method according to claim 1, further comprising the step of transmitting radio signals from said central station in a first direction to a first peripheral station and in a second direction to a second peripheral station.

25. A method according to claim 1, further comprising the step of modulating said radio signals according to PSK.

26. A method according to claim 1, further comprising the step of modulating said radio signals according to FSK.

27. A method according to claim 1, further comprising the step of modulating said radio signals according to QAM.

28. A method according to claim 1, further comprising the step of modulating said radio signals according to COFDM.

29. A method according to claim 1, further comprising the step of arranging at least one central station as a satellite.

* * * * *